United States Patent
Liu et al.

(10) Patent No.: US 8,254,343 B2
(45) Date of Patent: Aug. 28, 2012

(54) MULTI-RADIO PLATFORM AND METHOD FOR MITIGATING INTERFERENCE BETWEEN CO-LOCATED RADIOS

(75) Inventors: Hsin-Yuo Liu, San Jose, CA (US); Xintian E Lin, Palo Alto, CA (US); Xue Yang, Arcadia, CA (US)

(73) Assignee: Intel Corporation, Santa Clara, CA (US)

( * ) Notice: Subject to any disclaimer, the term of this patent is extended or adjusted under 35 U.S.C. 154(b) by 234 days.

(21) Appl. No.: 12/645,507

(22) Filed: Dec. 23, 2009

(65) Prior Publication Data

US 2011/0149920 A1    Jun. 23, 2011

(51) Int. Cl.
*H04J 3/00* (2006.01)
(52) U.S. Cl. .......................... 370/336; 455/296; 455/41.2
(58) Field of Classification Search .................. 370/336, 370/286, 289, 290, 343, 329, 338, 281; 455/63.1, 455/67.13, 222, 278.1, 296
See application file for complete search history.

(56) References Cited

U.S. PATENT DOCUMENTS

| 8,046,024 B2* | 10/2011 | Sudak et al. | 455/552.1 |
| 2009/0147763 A1* | 6/2009 | Desai et al. | 370/343 |
| 2009/0201862 A1* | 8/2009 | Okker et al. | 370/329 |
| 2010/0056136 A1* | 3/2010 | Zhu | 455/426.1 |
| 2010/0165959 A1* | 7/2010 | Park et al. | 370/338 |
| 2010/0265856 A1* | 10/2010 | Yang | 370/281 |

* cited by examiner

*Primary Examiner* — Brenda H Pham
(74) *Attorney, Agent, or Firm* — Schwegman, Lundberg & Woessner, P.A.

(57) ABSTRACT

Embodiments of a multi-radio platform and method for mitigating the effects of interference are generally described herein. In some embodiments, the multi-radio platform includes co-located radios including a Bluetooth transceiver and a wireless network transceiver. The wireless network transceiver may apply a transmit-active noise-cancellation matrix to signals received by the wireless network transceiver when the Bluetooth transceiver is transmitting and may apply a transmit-inactive noise-cancellation matrix to signals received when the Bluetooth transceiver is not transmitting. The transmit-active noise-cancellation matrix may mitigate effects of emissions generated by the Bluetooth transceiver when the Bluetooth transceiver is transmitting. The transmit-inactive noise-cancellation matrix is to mitigate effects of platform noise generated by platform elements of the multi-radio platform.

26 Claims, 5 Drawing Sheets

MULTI-RADIO PLATFORM AND METHOD FOR MITIGATING INTERFERENCE BETWEEN CO-LOCATED RADIOS

TECHNICAL FIELD

Embodiments pertain to wireless communication devices that include co-located transceivers. Some embodiments pertain to the interference mitigation. Some embodiments pertain to wireless communication devices that include a Bluetooth transceiver and a wireless network transceiver such as Worldwide Interoperability for Microwave Access (WiMAX) transceiver and/or a Wireless Fidelity (WiFi) transceiver.

BACKGROUND

Multi-radio platforms are wireless communication devices with co-located transceivers that communicate using two or more communication techniques. One issue with multi-radio platforms is that interference between the co-located transceivers may result in increased noise degrading the communication abilities of the devices. This is especially a concern in multi-radio platforms that include a Bluetooth transceiver and a wireless network transceiver such as WiMAX transceiver and/or a WiFi transceiver because their frequency spectrums are close and/or overlap to each other. Out-of-band (OOB) emissions from the Bluetooth transceiver as well as platform noise may interfere with the reception of signals by the wireless network transceiver.

Thus, there are general needs for multi-radio wireless communication devices and methods that coordinate activities between the co-located transceivers to reduce the effects interference.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
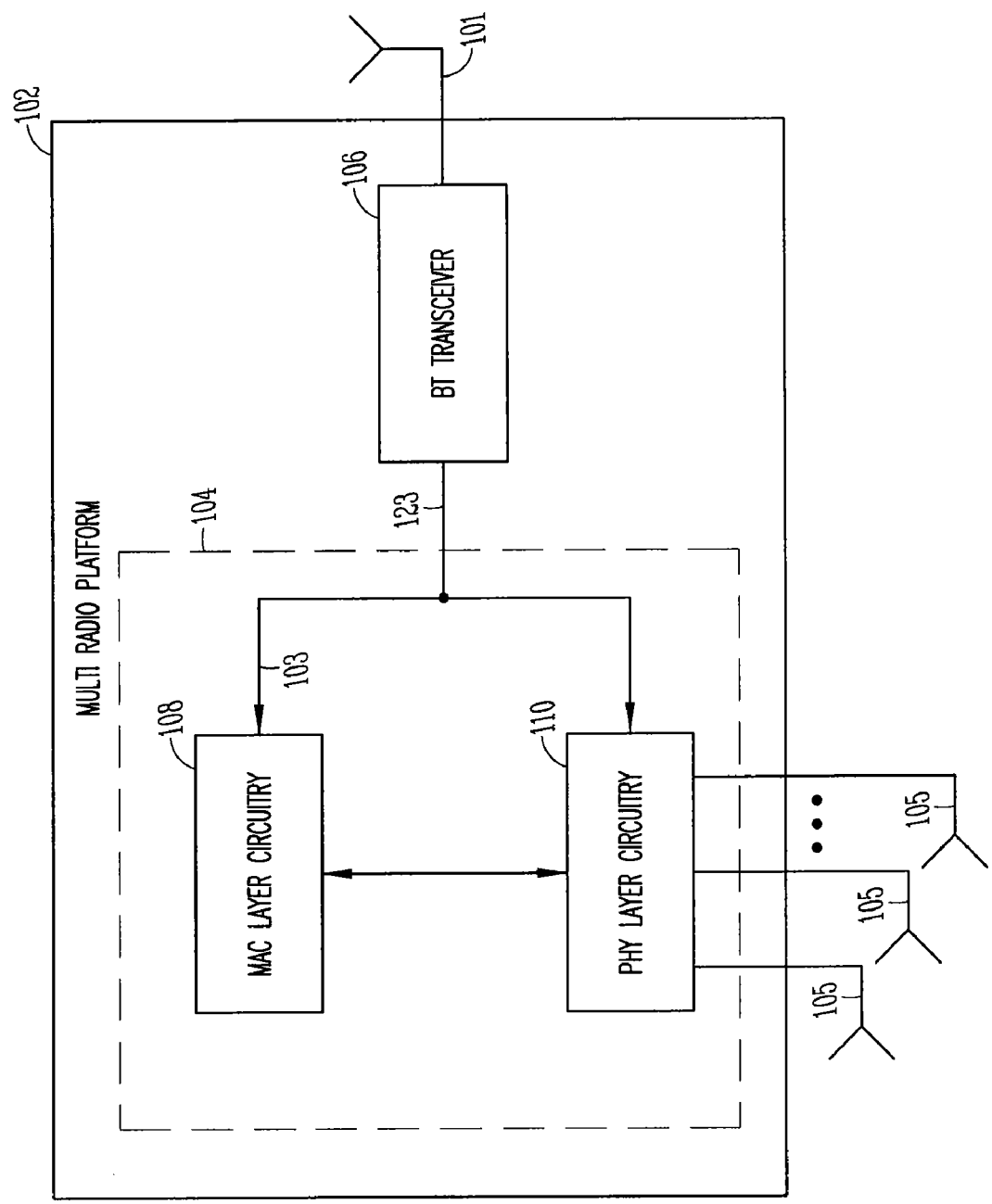
FIG. 1 is a functional diagram of a multi-radio platform in accordance with some embodiments.

FIG. 1 is a functional diagram of a multi-radio platform in accordance with some embodiments. Multi-radio platform 102 may comprise co-located radios including a transceiver such as Bluetooth (BT) transceiver 106 and a wireless network transceiver 104. As illustrated, the wireless network transceiver 104 may include physical (PHY) layer circuitry 110 and media-access control (MAC) layer circuitry 108. The wireless network transceiver 104 may receive signals through two or more antennas 105. The Bluetooth transceiver 106 may utilize antenna 101 for short-range communications. These co-located radios may operate within the same or a nearby frequency range and therefore transmissions by one of the radios may interfere with receptions with another one of the radios. For example, out-of-band (OOB) emissions by the Bluetooth transceiver 106 may be within the receive frequency range of the wireless network transceiver 104 and may interfere with signal receptions by the wireless network transceiver 104.

Conventional platform noise cancellation (PNC) techniques are inadequate to cancel interference because these conventional techniques assume that out-of-band emissions are part of the platform noise. The interference that occurs when the Bluetooth transceiver 106 is transmitting (e.g., OOB emissions) may be vastly different than the interference that occurs when the Bluetooth transceiver 106 is not transmitting (i.e., platform noise).

In accordance with embodiments, the wireless network transceiver 104 applies a transmit-active noise-cancellation matrix to signals received by the wireless network transceiver 104 when the Bluetooth transceiver 106 is transmitting, and applies a transmit-inactive noise-cancellation matrix to signals received by the wireless network transceiver 104 when the Bluetooth transceiver 106 is not transmitting. The application of the transmit-active noise-cancellation matrix may mitigate effects of emissions generated by the Bluetooth transceiver 106 when the Bluetooth transceiver 106 is transmitting. The application of the transmit-inactive noise-cancellation matrix is to mitigate effects of platform noise generated by elements of the multi-radio platform 102. The real-time knowledge of the state of the Bluetooth transceiver 106 allows the proper noise-cancellation matrix to be selected providing improved noise cancellation over conventional techniques.

In these embodiments, emissions generated by the Bluetooth transceiver 106 may include OOB emissions such as harmonics of the Bluetooth transceiver 106 as well as other emissions that may be within the receive frequency range of the wireless network transceiver 104. Platform noise may include noise generated by a display, such as a liquid crystal display (LCD) and noise generated by a PCI express bus of the multi-radio platform 102, which may also be within the receive frequency range of the wireless network transceiver 104.

In some embodiments, the wireless network transceiver 104 may perform interference sampling during a transmit-active period of the Bluetooth transceiver 106 and calculate the transmit-active noise-cancellation matrix based on the interference sampling performed during the transmit-active period. The wireless network transceiver 104 may also perform interference sampling during a transmit-inactive period of the Bluetooth transceiver 106 and calculate the transmit-inactive noise-cancellation matrix based on the interference sampling performed during the transmit-inactive period.

In some embodiments, the interference sampling and the selective application of one of the noise-cancellation matrices are performed by the physical layer circuitry 110. The noise-cancellation matrices are generated by MAC layer circuitry 108. The MAC layer circuitry 108 may implement MAC-Coordination (MAC-C) techniques to coordinate activities of the Bluetooth transceiver 106 and the wireless network transceiver 104. In some embodiments discussed in more detail below, PNC techniques may be combined with MAC-C techniques for interference mitigation.

In some embodiments, the Bluetooth transceiver 106 may provide a transmit-active signal 123 to both the MAC layer circuitry 108 and the physical layer circuitry 110 over a coexistence interface 103. The transmit-active signal 123 may indicate that the Bluetooth transceiver 106 is actively transmitting (i.e., is in a transit-active period and not in a transit-inactive period). In these embodiments, the wireless network transceiver 104 may selectively apply either the transmit-active noise-cancellation matrix or the transmit-inactive noise-cancellation matrix to received digitized signals based on the state of the transmit-active signal 123.

In some embodiments, the physical layer circuitry 110 applies the transmit-active noise-cancellation matrix to signals received by the wireless network transceiver 104 only when the Bluetooth transceiver is transmitting and does not apply the transmit-active noise-cancellation matrix when the Bluetooth transceiver 106 is not transmitting.

Although the transmit-active noise-cancellation matrix and the transmit-inactive noise-cancellation matrix are referred to as noise-cancellation matrices, it should be understood that there is no requirement they effectively cancel all the noise in a received signal. The application of a noise-cancellation matrix to a received signal is intended to reduce or mitigate noise and interference.

In some embodiments, the transmit-active signal 123 may be provided over a MAC-C interconnect. In some embodiments, the transmit-active signal 123 may be provided to the MAC layer circuitry 108 via pin 1 and the transmit-active signal may be provided to the physical layer circuitry 110 via pin 2 an interface, such as the coexistence interface 103. In some embodiments discussed in more detail below, the coexistence interface 103 may be a four-wire interface. In some embodiments, MAC layer circuitry 108 may be configured to implement MAC-C functionality using the transmit and receive status of the wireless network transceiver 104 as well as Bluetooth transceiver 106 to prioritize and arbitrate their activities. The MAC-C functionality may utilize the interface to help prioritize and arbitrate the transmit and receive these transmit and receive activities.

In some embodiments, the wireless network transceiver 104 may operate as a multiple-input multiple-output (MIMO) transceiver. Signals may be received in either a diversity mode or a non-diversity mode. In the diversity mode, the same information signals are transmitted through two or more spatial channels by two or more antennas for receipt by two or more antennas 105. In a non-diversity mode, two or more different information signals are transmitted through the spatial channels for receipt by two or more antennas 105.

In some embodiments, the co-located radios may operate within the same or nearby frequency band. This frequency band may comprise a 2.4 to 2.6 GHz frequency band, although the scope of the embodiments is not limited in this respect.

In some embodiments, the wireless network transceiver 104 may be a broadband wireless access (BWA) network transceiver such as WiMAX transceiver or a 3GPP LTE transceiver. In other embodiments, the wireless network transceiver 104 may be a wireless local area network (WLAN) transceiver such as a WiFi transceiver. In some embodiments, the multi-radio platform 102 may include two or more wireless network transceivers 104. In these embodiments, the multi-radio platform 102 may include a BWA network transceiver and a WLAN transceiver, as well as the Bluetooth transceiver 106.

In some embodiments, the WiMAX transceiver may operate in accordance with an IEEE 802.16 standard and the WLAN transceiver may operate in accordance with an IEEE 802.11 standard. Although the Bluetooth transceiver 106 is described as a Bluetooth transceiver, the scope of the embodiments is not limited in this respect as embodiments are applicable to any short-range frequency hopping transceiver that may generate interference with the wireless network transceiver 104. In some embodiments, the Bluetooth transceiver 106 may be configured to operate in an adaptive frequency hopping mode to inhibit the Bluetooth transceiver 106 from hopping into a frequency band used by the wireless network transceiver 104. The term Bluetooth, as used herein may refer to a short-range digital communication protocol including a short-haul wireless protocol frequency-hopping spread-spectrum (FHSS) communication technique operating in the 2.4 GHz spectrum.

In some embodiments with a hardware-implemented physical layer, the physical layer circuitry 110 may comprises one or more application-specific integrated circuits and/or one or more digital signal processors (DSPs) to perform interference sampling and the selective application of the noise-cancellation matrices. The MAC layer circuitry 108 may comprise one or more software-configured processors to perform MAC layer functions including calculation of the noise-cancellation matrices. The software configured processors of the MAC layer circuitry 108 may comprise general-purpose processors such as ARM or ARC processors, although the scope of the embodiments is not limited in this respect.

In software-configured radio embodiments, the physical layer circuitry 110 may comprise one or more software-configured processors configurable to perform physical layer functions including performance of the interference sampling and the selective application of the noise-cancellation matrices in these embodiments, multi-radio platform may be a software-configured radio. The software configured processors of the physical layer circuitry 110 may comprise general-purpose processors such as ARM or ARC processors, although the scope of the embodiments is not limited in this respect.

In some embodiments, the wireless network transceiver 104 may be configured to communicate orthogonal frequency division multiplexed (OFDM) communication signals over a multicarrier communication channel. The OFDM signals may comprise a plurality of orthogonal subcarriers. In some of these multicarrier embodiments, the wireless network transceiver 104 may be part of a wireless local area network (WLAN) communication station such as a wireless access point (AP), base station or a mobile device including a Wireless Fidelity (WiFi) device. In some broadband multicarrier embodiments, the wireless network transceiver 104 may be part of a broadband wireless access (BWA) network communication station, such as a WiMAX communication station. In some other broadband multicarrier embodiments, the wireless network transceiver 104 may be a 3rd Generation Partnership Project (3GPP) Universal Terrestrial Radio Access Network (UTRAN) Long-Term-Evolution (LTE) or a Long-Term-Evolution (LTE) communication station, although the scope of the invention is not limited in this respect. In these broadband multicarrier embodiments, the wireless network transceiver 104 may communicate in accordance with an orthogonal frequency division multiple access (OFDMA) technique.

In some other embodiments, the wireless network transceiver 104 may communicate in accordance with one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, multi-radio platform 102 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

Antennas 105 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some MIMO embodiments, antennas 105 may be effectively separated to take advantage of spatial diversity and the different channel characteristics that may result between each of antennas 105 and the antennas of a transmitting station. In some MIMO embodiments, antennas 105 may be separated by up to ⅒ of a wavelength or more.

Figure 2:
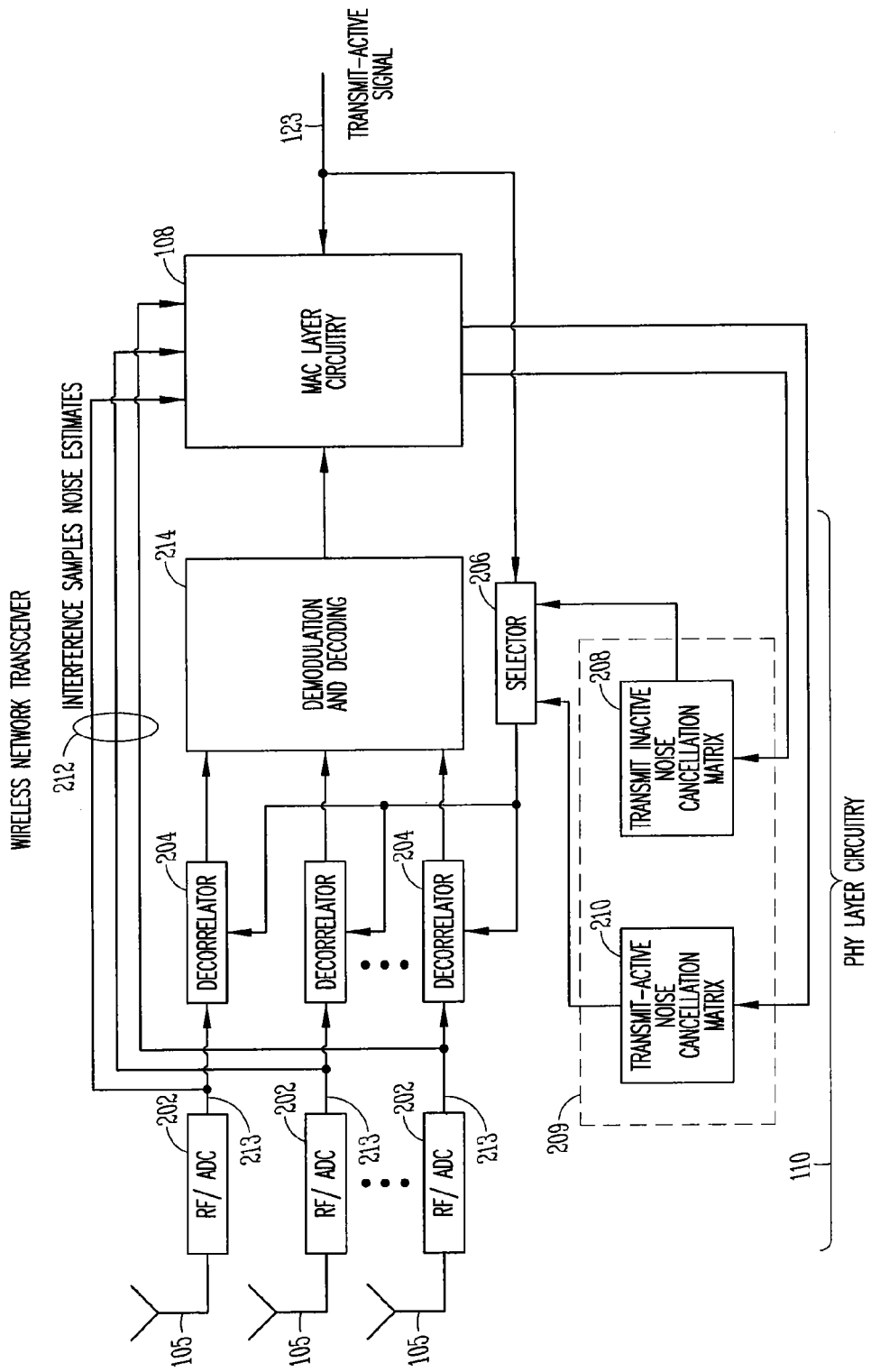
FIG. 2 is a functional diagram of a portion of a wireless network transceiver in accordance with some embodiments.

FIG. 2 is a functional diagram of a portion of the wireless network transceiver 104 of FIG. 1 in accordance with some embodiments. Wireless network transceiver 104 may include physical layer circuitry 110 and MAC layer circuitry 108. The physical layer circuitry 110 may include two or more receive-signal paths. Each receive-signal path may include RF/ADC circuitry 202 and a decorrelator 204. The RF/ADC circuitry 202 may include RF front-end circuitry to downconvert and digitize RF signals received through one of the antennas 105 to provide digital signals 213 to each of the decorrelators 204. The decorrelators 204 may selectively apply either the transmit-active noise-cancellation matrix 210 or the transmit-inactive noise-cancellation matrix 208 to the digital signals 213. The physical layer circuitry 110 may also include demodulation and decoding circuitry 214 to combine, demodulate and decode the signals provided by the decorrelators 204 to provide a single bit stream for the MAC layer circuitry 108.

In some embodiments, each decorrelator 204 may selectively apply either a transmit-active noise-cancellation matrix 210 or a transmit-inactive noise-cancellation matrix 208 to the received digital signals 213 within a receive-signal path of the wireless network transceiver 104 based on the transmit-active signal 123 provided by the Bluetooth transceiver 106 (FIG. 1). In some embodiments, the physical layer circuitry 110 may include selector 206 to select the appropriate noise-cancellation matrix based on the transmit-active signal 123. In these embodiments, the MAC layer circuitry 108 (FIG. 1) may generate the transmit-active noise-cancellation matrix 210 and the transmit-inactive noise-cancellation matrix 208 from interference samples 212 received through the antennas 105.

In embodiments that include at least two receive-signal paths to receive signals through at least two corresponding antennas 105, the MAC layer circuitry 108 (FIG. 1) may generate a transmit-active noise-cancellation matrix 210 and a transmit-inactive noise-cancellation matrix 208 for each receive-signal path from the interference samples 212 received through a corresponding one of the antennas 105. The physical layer circuitry 110 may apply a noise-cancellation matrix associated with the appropriate receive-signal path to the decorrelator 204 associated with the receive-signal path. In the example illustrated in FIG. 2, there are three receive-signal paths, each associated with an antenna 105, RF/ADC circuitry 202 and a decorrelator 204. In these embodiments, the MAC layer circuitry 108 may generate a transmit-active noise-cancellation matrix 210 for each receive-signal path and a transmit-inactive noise-cancellation matrix 208 for each receive-signal path. Each decorrelator 204 may be provided the noise-cancellation matrix associated with its receive-signal path.

In some embodiments, the MAC layer circuitry 108 may request the interference samples 212 from the physical layer circuitry 110 depending on whether the Bluetooth transceiver 106 is in the transmit-active period or the transmit-inactive period. In some embodiments, the MAC layer circuitry 108 may request the interference samples 212 from the physical layer circuitry 110 periodically. In some embodiments, the interference samples 212 may be I/Q samples provided by RF/ADC circuitry 202.

In some embodiments, after the MAC layer circuitry 108 calculates the noise-cancellation matrices, the MAC layer circuitry 108 may provide the noise-cancellation matrices to the physical layer circuitry 110 for storage in memory 209 for subsequent application to received signals. Memory 209 may be associated with the physical layer circuitry 110.

Figure 3:
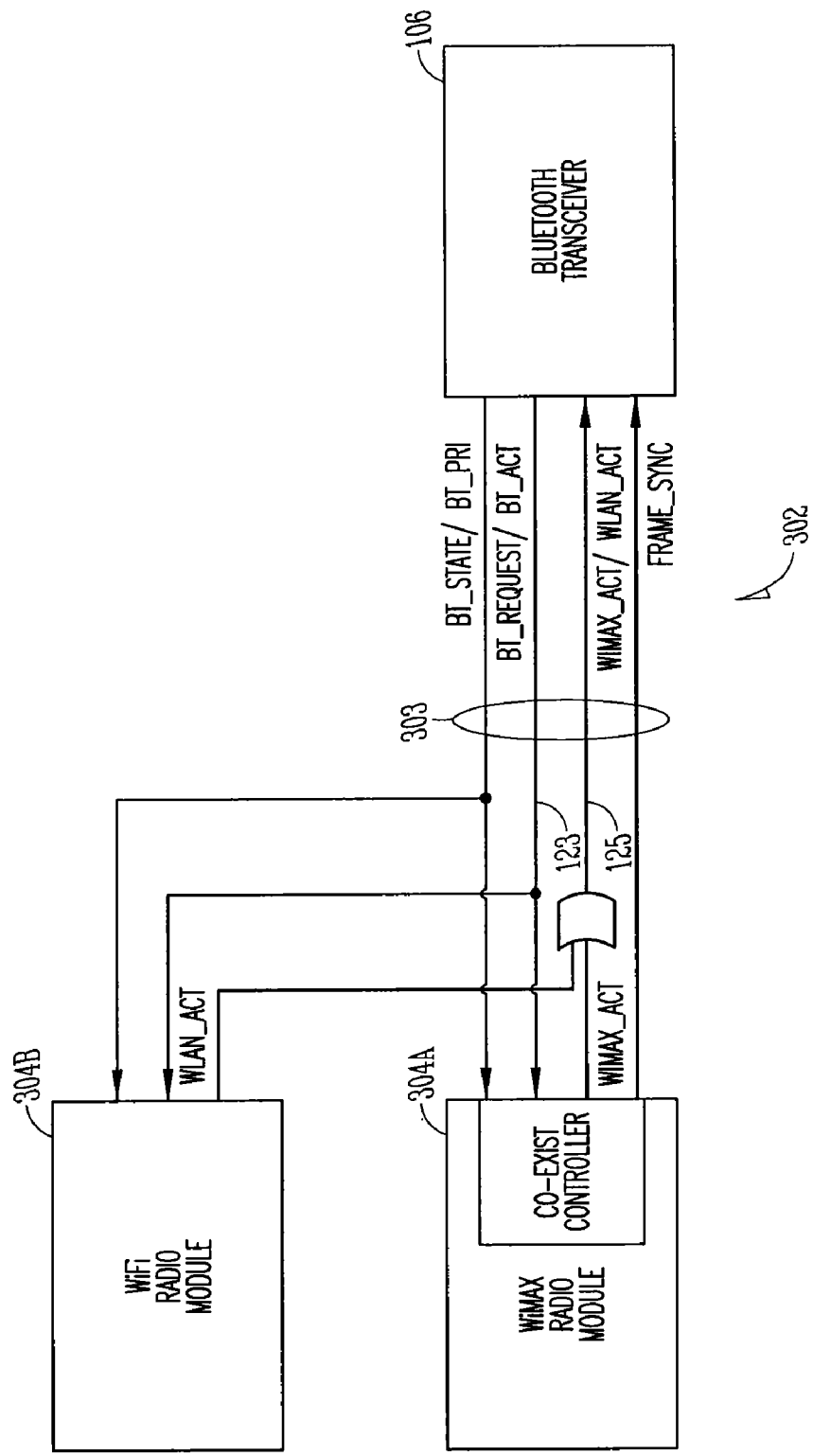
FIG. 3 is a functional diagram of a multi-radio platform including a coexistence interface in accordance with some embodiments.

FIG. 3 is a functional diagram of a multi-radio platform including a four-wire interface in accordance with some embodiments. In these embodiments, multi-radio platform 302 may include at least one of a WiMAX radio module 304A that operates in accordance with an IEEE 802.16 standard and a WiFi radio module 304B that operates in accordance with an IEEE 802.11 standard. In these embodiments, the transmit-active signal 123 (e.g., BT_ACT) may be provided to the WiMAX radio module 304A and/or the WiFi radio module 304B over an interface 303. In these embodiments, the WiMAX radio module 304A and the WiFi radio module 304B may correspond to the wireless network transceiver 104 (FIG. 1). In some embodiments, interface 303 may be a four-wire interface.

In these embodiments, the WiMAX radio module 304A may include a co-exist controller, which utilizes a coexistence interface (e.g., interface 303) to provide the WiMAX active signal and a frame sync signal to the Bluetooth transceiver 106 on two separate conductive paths. The co-exist controller may also receive the transmit-active signal 123 and a Bluetooth request signal from the Bluetooth transceiver 106 on two additional separate conductive paths of the interface 303. In these embodiments, the WiMAX active signal may be asserted by the co-exist controller during receipt of a downlink subframe by the WiMAX radio module 304A to indicate that the WiMAX radio module 304A is receiving.

In some embodiments, when there is too little isolation between the Bluetooth transceiver 106 and the wireless network transceiver 104 (FIG. 1) as the Bluetooth transceiver 106 is transmitting and the wireless network transceiver 104 is receiving, or when the transmit power level of the Bluetooth transceiver 106 is high, the front-end of the wireless network transceiver 104 may become saturated or may be in compression by the transmissions of the Bluetooth transceiver 106. In these embodiments, a network transceiver active signal 125 (e.g., WiMAX_ACT or WLAN_ACT) may be used to inhibit the Bluetooth transceiver 106 from transmitting when the wireless network transceiver 104 is receiving. In these embodiments, the MAC-C may perform time-division multiplexing (TDM) to allow the Bluetooth transceiver 106 to transmit when the wireless network transceiver 104 is not receiving. In these embodiments, the wireless network transceiver 104 applies a transmit-inactive noise-cancellation matrix to signals received by the wireless network transceiver 104 when the wireless network transceiver 104 is receiving.

In embodiments, when there is greater isolation between the Bluetooth transceiver 106 and the wireless network transceiver 104 as the Bluetooth transceiver 106 is transmitting and the wireless network transceiver 104 is receiving or when the transmit power level of the Bluetooth transceiver 106 is low (e.g., 0 dBm), the saturation or compression of the front-end may be less of an issue and OOB interference may dominate. In these embodiments, the PNC techniques disclosed herein may be used. In these embodiments, the wireless network transceiver 104 applies a transmit-active noise-cancellation matrix to signals received by the wireless network transceiver 104 when the Bluetooth transceiver 106 is transmitting, and applies a transmit-inactive noise-cancellation matrix to signals received by the wireless network transceiver 104 when the Bluetooth transceiver 106 is not transmitting. The use of these PNC techniques does not restrict the transmission times of the Bluetooth transceiver 106 as do the MAC-C TDM techniques. In some embodiments, the multi-radio platform 102 (FIG. 1) may perform isolation measurements to determine whether to use the MAC-C TDM techniques of the PNC techniques although this is not a requirement.

Figure 4:
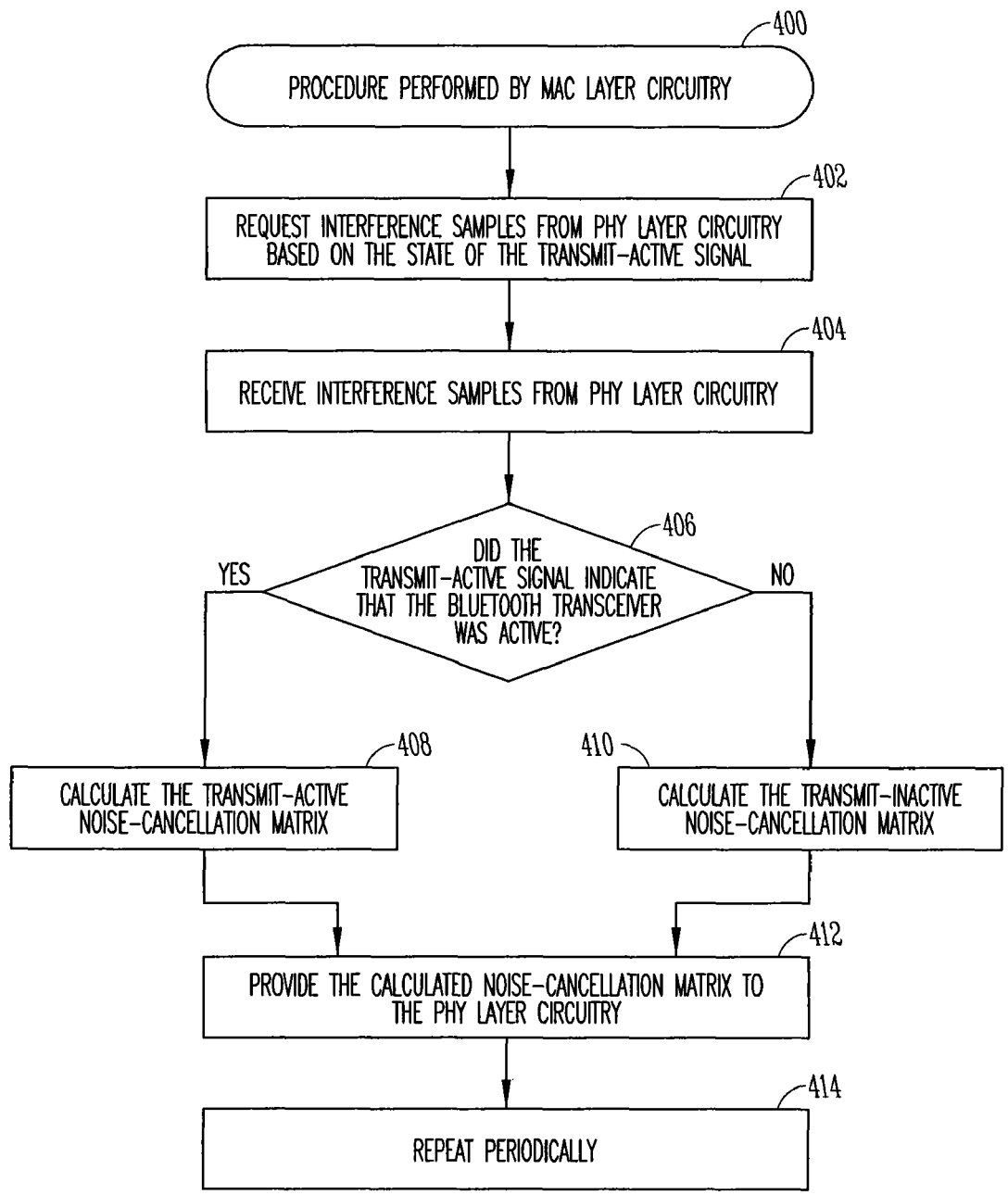
FIG. 4 is a procedure performed by media-access control layer circuitry in accordance with some embodiments.

FIG. 4 is a procedure performed by media-access control layer circuitry, in accordance with some embodiments. Procedure 400 may be performed by MAC layer circuitry 108 (FIG. 1) to generate interference-cancellation matrices.

In operation 402, the MAC layer circuitry 108 may request interference samples from the physical layer circuitry 110 (FIG. 1). The request may be based on state of transmit-active signal 123 (FIG. 1) of the Bluetooth transceiver 106 (FIG. 1).

In operation 404, the MAC layer circuitry 108 may receive the interference samples from the physical layer circuitry. In some embodiments, the interference samples 212 (FIG. 2) may be I/Q samples provided by RF/ADC circuitry 202 (FIG. 2).

In operation 406, the MAC layer circuitry 108 may determine whether the transmit-active signal indicated whether the Bluetooth transceiver 106 was actively transmitting when the interference samples were received based on the state of the transmit-active signal 123. When the Bluetooth transceiver 106 was actively transmitting, operation 408 is performed. When the Bluetooth transceiver 106 was not actively transmitting, operation 410 is performed.

In operation 408, the MAC layer circuitry 108 calculates the transmit-active noise-cancellation matrix. In operation 410, the MAC layer circuitry 108 calculates the transmit-inactive noise-cancellation matrix. In some embodiments, the MAC layer circuitry 108 may calculate a noise-cancellation matrix for each receive-signal path based on the interference samples from each antenna 105 (FIG. 1).

In operation 412, the MAC layer circuitry 108 provides the noise-cancellation matrix calculated in operation 408 to the physical layer circuitry 110.

Operation 414 may include repeating operations 402-412 periodically so that the transmit-active noise-cancellation matrix and the transmit-inactive noise-cancellation matrix can be updated as conditions change.

Figure 5:
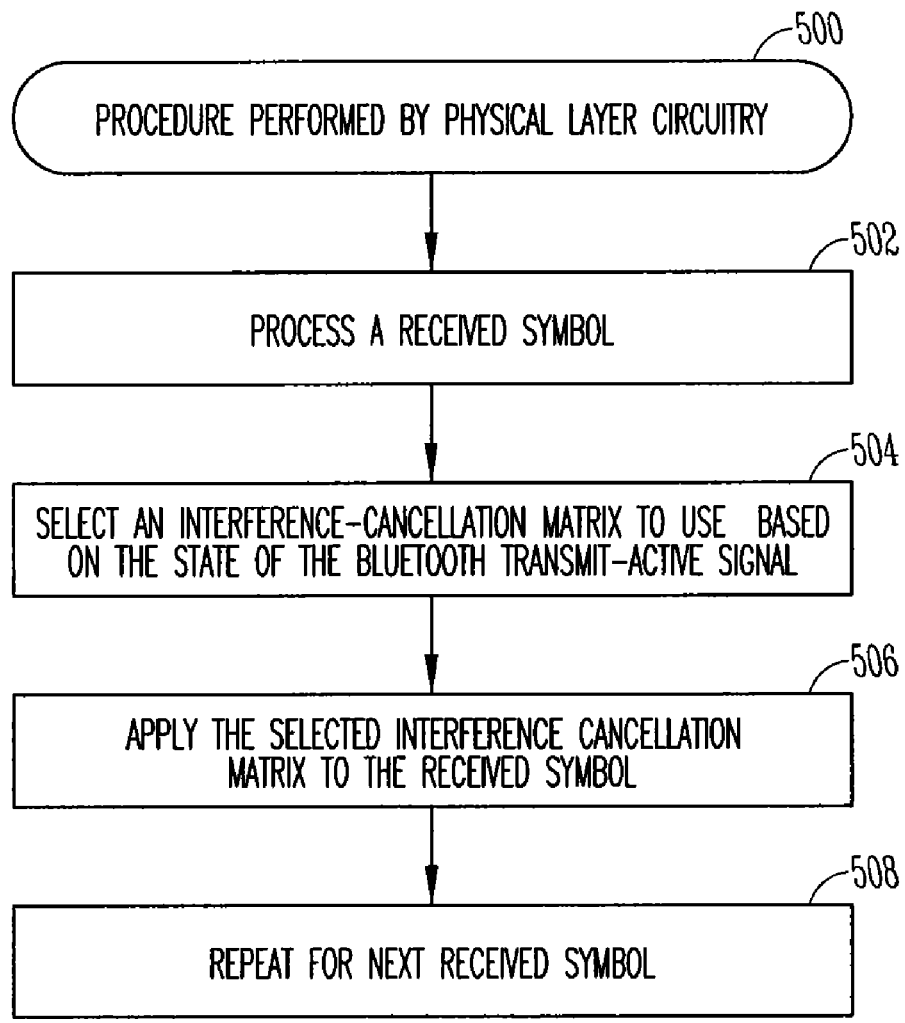
FIG. 5 is a procedure performed by physical layer circuitry in accordance with some embodiments.

FIG. 5 is a procedure performed by physical layer circuitry in accordance with some embodiments. Procedure 500 may be performed by the physical layer circuitry 110 (FIG. 1) to perform interference mitigation on received symbols.

In operation 502, a received symbol is processed. In some OFDM embodiments, the received symbol may be an OFDM symbol.

In operation 504, the physical layer circuitry 110 may be selected either a transmit-active noise-cancellation matrix or a transmit-inactive noise-cancellation matrix depending on the state of the transmit-active signal 123 (FIG. 1).

In operation 506, the physical layer circuitry 110 may apply the selected noise-cancellation matrix to the received symbol. In some embodiments, the selected noise-cancellation matrix may be applied by decorrelators 204 (FIG. 2). In some embodiments, a noise-cancellation matrix may be selected for each receive-signal path.

Operation 508 repeats operations 502 through 506 for each received symbol to mitigate the effects of interference in the received signal.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A multi-radio platform comprising co-located radios including a Bluetooth transceiver and a wireless network transceiver, wherein the wireless network transceiver comprises:
   a decorrelator for each receive signal path among a plurality of signal paths; and
   a selector to:
      select a first noise cancellation when the Bluetooth transceiver is transmitting;
      select a second noise cancellation when the Bluetooth transceiver is not transmitting; and
      receive a transmit-active signal from by the Bluetooth transceiver to indicate whether the Bluetooth transceiver is transmitting, wherein the selector is to select either the first noise cancellation or the second noise cancellation based on the transmit-active signal, and the decorrelator is to apply the selected noise cancellation to signals received by the wireless network transceiver.

2. The multi-radio platform of claim 1, wherein the wireless network transceiver is to:
   perform interference sampling during a transmit-active period of the Bluetooth transceiver and calculate the first noise cancellation based on the interference sampling performed during the transmit-active period; and
   perform interference sampling during a transmit-inactive period of the Bluetooth transceiver and calculate the second noise cancellation based on the interference sampling performed during the transmit-inactive period.

3. The multi-radio platform of claim 1, wherein application of the first noise cancellation is to mitigate effects of emissions generated by the Bluetooth transceiver when the Bluetooth transceiver is transmitting, and
   wherein application of the second noise cancellation is to mitigate effects of platform noise generated by elements of the multi-radio platform.

4. The multi-radio platform of claim 1, wherein the wireless network transceiver includes at least two receive-signal paths to receive signals through at least two corresponding antennas,
   wherein a first noise cancellation and a second noise cancellation are generated for each receive-signal path from interference samples received through a corresponding one of the antennas, and
   wherein the first or second noise cancellation associated with the receive-signal path is applied by a decorrelator associated with the receive-signal path.

5. The multi-radio platform of claim 1, wherein the co-located radios operate within a same or nearby frequency band.

6. The multi-radio platform of claim 5, wherein the wireless network transceiver comprises at least one of a WiMAX transceiver that operates in accordance with an IEEE 802.16 standard and a WLAN transceiver that operates in accordance with an IEEE 802.11 standard.

7. The multi-radio platform of claim 2, wherein the wireless network transceiver comprises physical layer circuitry and media-access control layer circuitry,
wherein the physical layer circuitry is to perform the interference sampling during the transmit-active period and the media-access control layer circuitry is to calculate the first noise cancellation,
wherein the physical layer circuitry is to perform the interference sampling during the transmit-inactive period and the media-access control layer circuitry is to calculate the second noise cancellation,
wherein the physical layer circuitry is to apply the first noise cancellation when the Bluetooth transceiver is transmitting and is to apply the second noise cancellation when the Bluetooth transceiver is not transmitting.

8. The multi-radio platform of claim 7, wherein the Bluetooth transceiver is to provide the transmit-active signal to both the media-access control layer circuitry and the physical layer circuitry over a coexistence interface, and
wherein after media-access control layer circuitry calculates the first and second noise cancellations, the media-access control layer circuitry is to provide the first and second noise cancellations to the physical layer circuitry for storage and for subsequent application to received signals.

9. The multi-radio platform of claim 7, wherein the physical layer circuitry comprises at least one of an application-specific integrated circuits and a digital signal processor to perform the interference sampling and selective application of the first and second noise cancellations, and wherein the media-access control layer circuitry includes one or more software-configured processors to calculate the first and second noise cancellations.

10. The multi-radio platform of claim 7, wherein the physical layer circuitry comprises one or more software-configured processors to perform the interference sampling and selective application of the first and second noise cancellations, and wherein the media-access control layer circuitry includes one or more software-configured processors to calculate the first and second noise cancellations.

11. The multi-radio platform of claim 1, wherein when there is less isolation between the Bluetooth transceiver and the wireless network transceiver when the Bluetooth transceiver is transmitting and the wireless network transceiver is receiving, the multi-radio platform is to implement a time-division multiplexing (TDM) technique to inhibit the Bluetooth transceiver from transmitting when the wireless network transceiver is receiving and apply the second noise cancellation, and
wherein when there is greater isolation between the Bluetooth transceiver and the wireless network transceiver when the Bluetooth transceiver is transmitting and the wireless network transceiver is receiving, the multi-radio platform is to apply either the first noise cancellation or the second noise cancellation.

12. A method of mitigating interference between co-located radios of a multi-radio platform, the co-located radios comprising a Bluetooth transceiver and at least one wireless network transceiver, the method comprising:
applying a first noise cancellation to signals received by the wireless network transceiver when the Bluetooth transceiver is transmitting; and
applying a second noise cancellation to signals received by the wireless network transceiver when the Bluetooth transceiver is not transmitting.

13. The method of claim 12, further comprising:
receiving a transmit-active signal from by the Bluetooth transceiver to indicate whether the Bluetooth transceiver is transmitting; and
responding to receipt of the transmit-active signal by applying either the first noise cancellation or the second noise cancellation.

14. The method of claim 13, further comprising:
performing interference sampling during a transmit-active period of the Bluetooth transceiver and calculate the first noise cancellation based on the interference sampling performed during the transmit-active period; and
performing interference sampling during a transmit-inactive period of the Bluetooth transceiver and calculate the second noise cancellation based on the interference sampling performed during the transmit-inactive period.

15. The method of claim 14, wherein the interference sampling and the applying are performed by physical layer circuitry of the wireless network transceiver, and wherein the first and second noise cancellations are generated by media-access control layer circuitry of the wireless network transceiver, and
wherein the method further comprises providing the transmit-active signal to both the media-access control layer circuitry and the physical layer circuitry to indicate when the Bluetooth transceiver is transmitting,
wherein the physical layer circuitry selectively applies either the first noise cancellation or the second noise cancellation based on a state of the transmit-active signal.

16. The method of claim 15, wherein application of the first noise cancellation is to mitigate effects of emissions generated by the Bluetooth transceiver when the Bluetooth transceiver is transmitting, and
wherein application of the second noise cancellation is to mitigate effects of platform noise generated by elements of the multi-radio platform.

17. A wireless network transceiver module for use in a multi-radio platform comprising:
processing circuitry to generate a first noise cancellation and a second noise cancellation; and
physical layer circuitry to apply the first noise cancellation when a co-located transceiver is transmitting and to apply the second noise cancellation when the co-located transceiver is not transmitting depending on a transmit-active signal provided by the co-located transceiver.

18. The wireless network transceiver module of claim 17, wherein the physical layer circuitry is to perform interference sampling during a transmit-active period of the co-located transceiver to allow media-access control circuitry to calculate the first noise cancellation, and
wherein the physical layer circuitry is to perform the interference sampling during a transmit-inactive period of the co-located transceiver to allow the media-access control circuitry to calculate the second noise cancellation.

19. The wireless network transceiver module of claim 18, wherein the physical layer circuitry includes a decorrelator to selectively apply either the first noise cancellation or the second noise cancellation to received digitized signals within a receive-signal path of the physical layer circuitry based on the transmit-active signal provided by the co-located transceiver.

20. The wireless network transceiver module of claim 19, wherein the physical layer circuitry includes at least two receive-signal paths to receive signals through at least two corresponding antennas,
    wherein a first noise cancellation and a second noise cancellation are generated by the media-access control circuitry for each receive-signal path from interference samples received through a corresponding one of the antennas, and
    wherein a noise cancellation associated with the receive-signal path is applied by the decorrelator associated with the receive-signal path.

21. The wireless network transceiver module of claim 20, wherein the wireless network transceiver module comprises at least one of a WiMAX transceiver that operates in accordance with an IEEE 802.16 standard and a WLAN transceiver that operates in accordance with an IEEE 802.11 standard, and
    wherein the co-located transceiver is a Bluetooth transceiver.

22. The wireless network transceiver module of claim 20, wherein when there is less isolation between the Bluetooth transceiver and the wireless network transceiver when the Bluetooth transceiver is transmitting and the wireless network transceiver is receiving, the processing circuitry is to implement a time-division multiplexing (TDM) technique to inhibit the Bluetooth transceiver from transmitting when the wireless network transceiver is receiving and apply the second noise cancellation, and
    wherein when there is greater isolation between the Bluetooth transceiver and the wireless network transceiver when the Bluetooth transceiver is transmitting and the wireless network transceiver is receiving, the processing circuitry is to apply either the first noise cancellation or the second noise cancellation.

23. A multi-radio platform comprising co-located radios including a Bluetooth transceiver and a WiMAX transceiver, wherein the WiMAX transceiver comprises:
    physical layer circuitry to apply a first noise cancellation to signals received by the WiMAX transceiver when the Bluetooth transceiver is transmitting and to apply a second noise cancellation to signals received by the WiMAX transceiver when the Bluetooth transceiver is not transmitting; and
    processing circuitry to cause the physical layer circuitry to implement a time-division multiplexing (TDM) technique to inhibit the Bluetooth transceiver from transmitting when the WiMAX transceiver is receiving and apply the second noise cancellation.

24. The multi-radio platform of claim 23 wherein the processing circuitry is to cause the physical layer circuitry to implement the TDM technique when there is less isolation between the Bluetooth transceiver and the WiMAX transceiver, and
    wherein the processing circuitry is to cause the physical layer circuitry to refrain from implementing the TDM technique when there is greater isolation between the Bluetooth transceiver and the WiMAX transceiver.

25. The multi-radio platform of claim 24, wherein the WiMAX transceiver is to:
    receive a transmit-active signal from by the Bluetooth transceiver to indicate whether the Bluetooth transceiver is transmitting;
    respond to receipt of the transmit-active signal by applying either the first noise cancellation or the second noise cancellation;
    perform interference sampling during a transmit-active period of the Bluetooth transceiver and calculate the first noise cancellation based on the interference sampling performed during the transmit-active period; and
    perform interference sampling during a transmit-inactive period of the Bluetooth transceiver and calculate the second noise cancellation based on the interference sampling performed during the transmit-inactive period.

26. The multi-radio platform of claim 25, wherein the WiMAX transceiver operates in accordance with an IEEE 802.16 standard.

* * * * *